United States Patent
Petolino, Jr.

(10) Patent No.: US 8,316,212 B2
(45) Date of Patent: *Nov. 20, 2012

(54) TRANSLATION LOOKASIDE BUFFER (TLB) WITH RESERVED AREAS FOR SPECIFIC SOURCES

(75) Inventor: Joseph A. Petolino, Jr., Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/338,656

(22) Filed: Dec. 28, 2011

(65) Prior Publication Data

US 2012/0102296 A1    Apr. 26, 2012

Related U.S. Application Data

(63) Continuation of application No. 12/474,783, filed on May 29, 2009, now Pat. No. 8,108,650.

(51) Int. Cl.
*G06F 9/34* (2006.01)
(52) U.S. Cl. ...................................................... 711/207
(58) Field of Classification Search ................. 365/207; 711/207

See application file for complete search history.

(56) References Cited

U.S. PATENT DOCUMENTS

| | | | |
|---|---|---|---|
| 4,376,297 A | 3/1983 | Anderson | |
| 5,434,992 A | 7/1995 | Mattson | |
| 5,584,014 A | 12/1996 | Nayfeh | |
| 5,802,602 A | 9/1998 | Rahman | |
| 6,260,131 B1 * | 7/2001 | Kikuta et al. | 711/210 |
| 6,421,761 B1 | 7/2002 | Arimilli | |
| 6,516,387 B1 | 2/2003 | Auracher | |
| 6,629,208 B2 | 9/2003 | Sturges | |
| 6,674,441 B1 * | 1/2004 | Frank | 345/503 |
| 6,865,647 B2 | 3/2005 | Olarig | |
| 6,988,168 B2 | 1/2006 | Rowlands | |
| 7,120,651 B2 | 10/2006 | Bamford | |
| 7,415,575 B1 | 8/2008 | Tong | |
| 8,108,650 B2 * | 1/2012 | Petolino, Jr. | 711/207 |
| 2003/0217229 A1 * | 11/2003 | Rowlands et al. | 711/129 |
| 2006/0294341 A1 * | 12/2006 | Plondke et al. | 711/207 |

* cited by examiner

*Primary Examiner* — Hoai V Ho
*Assistant Examiner* — Jay Radke
(74) *Attorney, Agent, or Firm* — Lawrence J. Merkel; Meyertons, Hood, Kivlin, Kowert & Goetzel, P.C.

(57) ABSTRACT

In an embodiment, a TLB is partitioned into regions. The TLB may be set associative, and each section may include a portion of the locations in each way of the set associative memory. The TLB may reserve at least one of the sections for access by a subset of the request sources that use the TLB. For requests from the subset, the reserved section may be used and a location in the reserved section may be allocated to store a translation for a request from the subset that misses in the TLB. For requests for other request sources, the non-reserved section or sections may be used. In one embodiment, each way of the reserved section may be assigned to a different one of the request sources in the subset.

19 Claims, 5 Drawing Sheets

TRANSLATION LOOKASIDE BUFFER (TLB) WITH RESERVED AREAS FOR SPECIFIC SOURCES

This application is a continuation of U.S. patent application Ser. No. 12/474,783, filed May 29, 2009 now U.S. Pat. No. 8,108,650, which is incorporated herein by reference in its entirety.

BACKGROUND

1. Field of the Invention

This invention is related to the field of digital systems and, more particularly, to address translation mechanisms in such systems.

2. Description of the Related Art

Address translation is often used in systems that include multiple memory request sources and a memory shared by the sources. The sources can include processors, direct memory access (DMA) units acting on behalf of various peripheral devices, and/or the peripheral devices themselves. Address translation may be used to ensure that different sources do not interfere with each other's access to memory, to provide a larger virtual memory than is actually available in the physical memory (along with software to page data in and out of the memory as needed), etc. Thus, a given source may transmit a memory request with a virtual address, and the address translation mechanism may translate the address to a corresponding physical address.

Typically, the virtual to physical address translations are stored in a set of software-managed page tables in memory. The virtual address can be used as an index (relative to a base address of the page table) from which a page table entry or entries is read in order to locate the correct translation. Some address translation schemes use multiple page table reads in a hierarchical or non-hierarchical fashion to locate a translation. Other schemes can use a single page table read to locate a translation.

The latency for performing the translation can be reduced by providing a translation lookaside buffer (TLB) that caches recently used translations for rapid access in response to a memory request from a source. The TLB is a finite resource, and can be shared by multiple requestors. Thus, the TLB is subject to potential interference by different sources (e.g. different sources, using different translations, can dislodge recently used translations corresponding to other sources). The competition for TLB space can reduce overall performance by increasing the latency for memory requests among the sources that are competing because of the increase in TLB misses.

SUMMARY

In an embodiment, a TLB is partitioned into two or more regions, or sections. The TLB may be set associative, and each section may include a portion of the locations in each way of the set associative memory. Each way may include a location that is selected for a given index (portion of the virtual address) input to the TLB. Thus, an N-way set associative memory selects N locations in response to a given index. The TLB may reserve at least one of the sections for access by a subset of the request sources that use the TLB. For requests from the subset, the reserved section may be used and a location in the reserved section may be allocated to store a translation for a request from the subset that misses in the TLB. For requests for other request sources, the non-reserved section or sections may be used. More particularly, in one embodiment, each way of the reserved section may be assigned to a different one of the request sources in the subset. In response to a miss from one of the sources, the TLB may allocate a location in the respective way to store the translation. In the non-reserved section, the ways may be allocated to misses according to a replacement algorithm such as least recently used (LRU), pseudo-LRU, random, etc.

The subset of request sources that use the reserved section may be latency-sensitive request sources such as video processing units. By reserving ways in the reserved section for respective video processing units, the competition for TLB space may be reduced for the video processing units and thus the latency for the requests from these units may be reduced because of the reduced TLB misses, in one embodiment. In one embodiment, the reserved section may be used only for read requests from the video processing units. Write requests from the video processing units may access the non-reserved section of the TLB.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
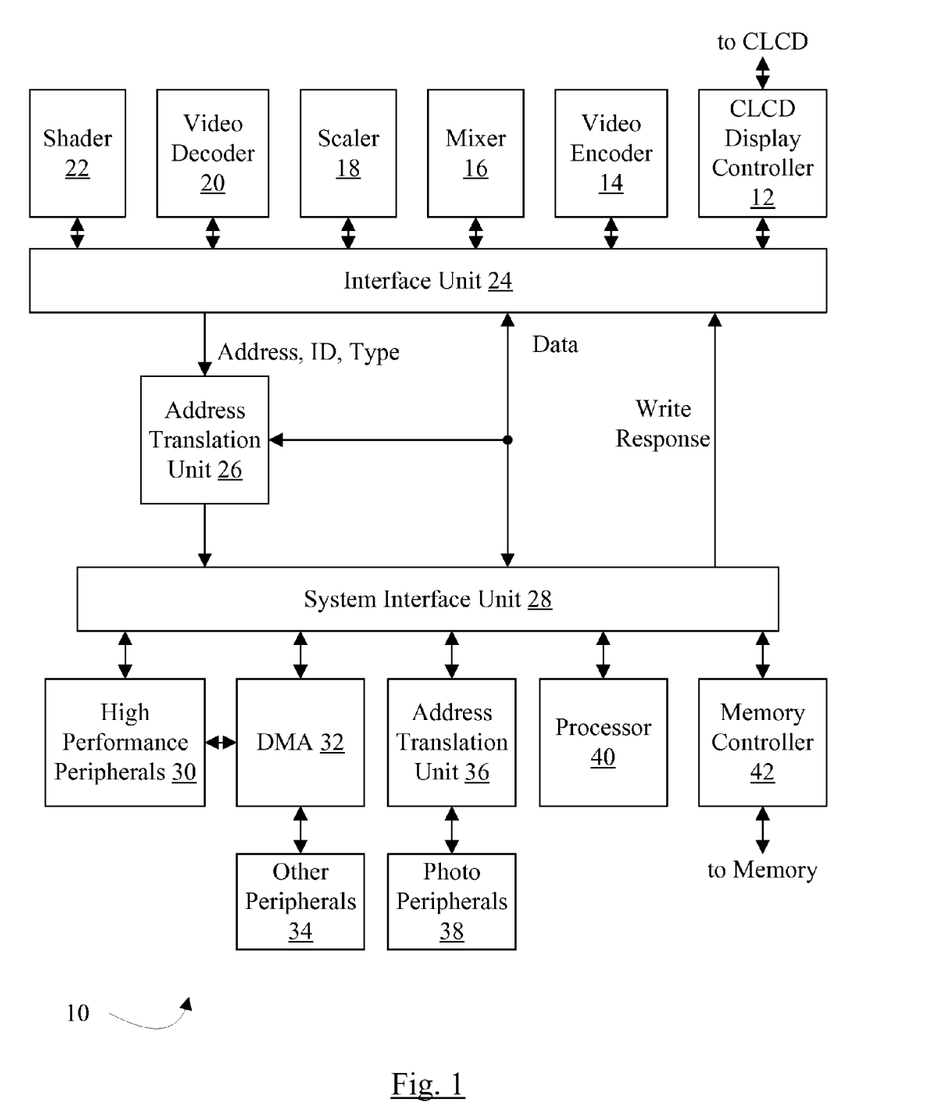
FIG. 1 is a block diagram of one embodiment of a system including one or more address translation units.

Turning now to FIG. 1, a block diagram of one embodiment of a system 10 is shown. In the embodiment of FIG. 1, the system 10 includes a color liquid crystal display (CLCD) display controller 12, a video encoder 14, a mixer 16, a scaler 18, a video decoder 20, a shader 22, an interface unit 24, an address translation unit 26, a system interface unit (SIU) 28, one or more high performance peripherals 30, a direct memory access (DMA) unit 32, one or more other peripherals 34, a second address translation unit 36, one or more photo peripherals 38, a processor 40, and a memory controller 42. The CLCD display controller 12, the video encoder 14, the mixer 16, the scaler 18, the video decoder 20, and the shader 22 are coupled to the interface unit 24, which is further coupled to the system interface unit 28. Other components coupled to the system interface unit 28, or a portion of the other components, may also be coupled through an interface unit similar to the interface unit 24 (not shown in FIG. 1). Alternatively, the interface unit 24 may be eliminated and the components coupled thereto may be coupled to the system interface unit 28 directly (except that the address portion of the connection may include the address translation unit 26, for at least some of the components. Specifically, in the illustrated embodiment, the interface unit 24 may coupled to the system interface unit 28 via an interconnect that includes an address interconnect, a data interconnect, and a write response interconnect as shown in FIG. 1. The address translation unit 26 is coupled to the address interconnect and may be configured to translate addresses of requests transmitted by the interface unit 24 to the system interface unit 28. The high performance peripherals 30, the DMA unit 32, the address translation unit 36, the processor 40, and the memory controller 42 are coupled to the system interface unit 28. The DMA unit 32 is coupled to the high performance peripherals 30 and the other peripherals 34. The address translation unit 36 is coupled to the photo peripherals 38. The memory controller 42 is coupled to a memory (not shown in FIG. 1). The CLCD display controller 12 is coupled to a CLCD (possibly through other components not shown in FIG. 1). In one embodiment, the system 10 as illustrated in FIG. 1 may be integrated onto a single integrated circuit chip as a system-on-a-chip (SOC). In other embodiments, two or more integrated circuits may be employed to provide the components illustrated in FIG. 1. In other embodiments, the system 10 may further include the CLCD, the memory, and various other components (e.g. components coupled to a peripheral interface).

As mentioned previously, the address translation unit 26 may provide address translation for one or more of the components that are coupled to the interface unit 24. For example, in one embodiment, the address translation unit 26 may provide address translation for the CLCD display controller 12, the video encoder 14, the mixer 16, the scaler 18, and the shader 22. The video decoder 20 may employ its own internal address translation mechanism. Other embodiments may use the address translation unit 26 for address translation for different subsets of the components, or for all of the components, as desired.

Generally, the process of address translation (or more briefly, "translation") may refer to modifying a virtual address input to the address translation unit 26 to a physical address that may actually be used to access memory. The physical address may often be numerically different from the virtual address, although it is possible to map a virtual address to a numerically equal physical address, often referred to as a unity mapping. The translation is determined based on data stored in one or more page tables in memory, which map virtual addresses to physical addresses on a page granularity. Software may control the mappings of virtual addresses to physical addresses by modifying the contents of the page tables. Pages sizes may vary from embodiment to embodiment. For example, 4 kilobytes is a typical page size, although larger page sizes are supported in various embodiments, up to Megabytes in size. Even larger page sizes may be supported in the future. In some embodiments, multiple page sizes are supported and may be programmably selectable and/or there may be mixed sizes in use at the same time. A specific mapping from a virtual page to a physical page may also be referred to as a translation.

The address translation unit 26 may include a translation lookaside buffer (TLB), which may cache one or more translations that have been recently used by the address translation unit 26. Thus, low latency translation may be performed for virtual addresses that hit in the TLB, and somewhat higher latency translation may be performed for a virtual address that misses in the TLB (since a table walk of the page tables in memory is needed to obtain the translation).

One or more of the components for which the address translation unit 26 provides address translation may be latency sensitive components that may not tolerate frequent misses in the TLB. For example, the CLCD display controller may read data from memory to display an image on the CLCD display (e.g. frame buffer data). The addresses of these memory read operations may be translated by the address translation unit 26. The display controller is displaying the image on the display for the user to view, and unexpected latency in reading the data may lead to visible effects on the display. The video encoder 14 may also be sensitive to latency in reading memory, as may the video decoder 20 (although the video decoder 20 includes its own address translation unit, in this embodiment). Any video processing unit may be sensitive to memory read latency, in various embodiments. A video processing unit may be any circuitry that processes video data. The video processing units may include, e.g., the display controller 12, the video encoder 14, the mixer 16, the scaler 18, the video decoder 20, and/or the shader 22. Video processing units may also include any other circuitry that processes video data. In the present embodiment, the display controller 12 and the video encoder 14 are sensitive to memory read delay, and other components are not latency sensitive or include their own address translation unit. Other embodiments may have more or fewer video processing units that are latency sensitive.

The address translation unit 26 may include a statically-partitioned memory in the TLB. Generally, a memory may be partitioned if one or more attributes (other than the address) of an access to the memory are used to identify a region (or portion, or section) of the memory to be read/written for the access. Each region/portion/section may be referred to as a partition. Other partitions are not read/written for the access. Dynamic partitioning may modify the partitioning of the memory, changing the region to which a given memory location is mapped. Static partitioning may be fixed in hardware, and may not be changed. While the present embodiment is statically partitioned, other embodiments may be dynamically partitioned if desired.

More particularly in one embodiment, the attributes used to select the partition may be attributes which identify requests that are issued by components that are latency sensitive. The address translation unit 26 may be configured to access one of the partitions in the TLB memory in response to requests from the latency sensitive components, and another partition for other (non-latency sensitive) components. Viewed in another way, the latency sensitive partition of the memory is reserved for requests from latency sensitive request sources. More than two partitions may be implemented in other embodiments.

The TLB memory may have a set associative configuration, and each partition may include locations in each way of the set associative memory. That is, the partitioning of the TLB memory may be among the sets of the memory, where each set includes a location in each of the ways. The location in each way includes sufficient storage for a translation (e.g. a virtual page number tag, for comparison to the input virtual page number, the physical page number, a valid bit, and possibly attribute bits derived from the translation attributes, if any). Thus, an N-way set associative TLB includes N translation storage locations that correspond to a given index in the partition.

By partitioning the TLB memory, the latency sensitive request sources may not compete with the non-latency sensitive request sources for the same TLB storage locations. Viewed in another way, one partition may be dedicated to storing translations for requests from the latency sensitive request sources, and the other partition may store other translations. Thus, translations used by the latency sensitive request sources may not be displaced from the TLB by non-latency sensitive request sources.

Within the latency sensitive partition (referred to as the reserved partition herein), each way may be assigned to one of the latency sensitive request sources. Accordingly, a given way may be dedicated to storing translations from a specific one of the latency sensitive request sources. In the present embodiment, the TLB memory may be at least 2 way set associative, with one way in the reserved partition assigned to the display controller 12 and the other way in the reserved partition assigned to the video encoder 14. Other embodiments may include more ways, and ½ of the ways may be assigned to the display controller 12 and the other ½ may be assigned to the video encoder 14 within reserved partition. For example, a 4 way set associative TLB memory may include two ways assigned to the display controller 12 and 2 ways assigned to the video encoder 14. In this manner, different latency sensitive request sources may not compete with each other for TLB storage locations. The translations of a given latency-sensitive request source may only displace other translations from that given request source. Viewed in another way, the way(s) assigned to a given latency sensitive request source may be reserved for that request source.

More particularly, in one embodiment, that latency sensitive request sources may only be sensitive to memory read latencies. In such an embodiment, the read/write nature of the request may be included in determining if the reserved partition is accessed or if the non-latency-sensitive partition (the "general access partition," herein) is accessed. That is, read requests from the latency sensitive request sources may access the reserved partition, and write requests from the latency sensitive request sources may access the general access partition (as well as both read and write requests from the non-latency sensitive sources).

As mentioned above, the requestor identification and read/write nature of a request may control allocation of a location to store a translation in response to a TLB miss for a request. If a read request from a latency sensitive request source occurs, a location in the reserved partition (and in the way for that particular latency sensitive request source) may be allocated to store the resulting translation. The translation stored in the allocated location, if any, may be invalidated or may simply be overwritten with the missing translation read from the page tables in memory. Write requests from latency sensitive sources and read/write requests from non-latency sensitive request sources may be allocated to the general access partition.

As illustrated in FIG. 1, the address translation unit 26 may receive the address interconnect, which may include an address, an identifier, and a type (e.g. read/write). Various other information may be included in a request as well (e.g. a size), in various embodiments. In one implementation, the address interconnect may include separate channels for read and write requests. Accordingly, there may be a read address, a write address, a read identifier, and a write identifier. The read/write nature of the request may be inferred from which of the channels that are being used to transmit the request. Other embodiments may use other interconnects, packet based interconnect, etc. For example, an address interconnect that transmits one address and a read/write indication may be used.

The data interconnect may include a write data channel and a read data channel, or may be a bidirectional interconnect, in various embodiments. The address translation unit 26 may be coupled to the data interconnect to receive read data from table walks for TLB misses. The write response interconnect supplies responses for write requests (e.g. a completion indication).

The interface unit 24 may receive requests from the components 12, 14, 16, 18, 20, and 22 (or indications that requests are ready to be transmitted) and may be configured to arbitrate among the requests when there are conflicts. The interface unit 24 may be configured to transmit the requests on the address interconnect, and to route corresponding write data and read data to/from the data interconnect. Received write responses may be routed to the source of the corresponding write request.

The system interface unit 28 may be a "top level" interface connecting the various components of the system 10 and providing communication therebetween. The system interface unit may have similar interconnect to that shown with the interface unit 24, to couple to other components in the system 10.

The CLCD display controller 12 is configured to control the image displayed on the CLCD. For example, a frame buffer stored in memory may store the data that identifies the color that each pixel of the display should show, and the display controller 12 may read the frame buffer and display the image described by the frame buffer on the display. While a CLCD display controller is illustrated in FIG. 1, other embodiments may implement any display controller, configured to control any type of display.

The video encoder 14 may be configured to encode video streams using any desired coding scheme. Encoding schemes may include motion picture experts group (MPEG) versions 1-4 or any subsequent version, or any other video compression or coding scheme. Similar, the video decoder 20 may be configured to decode video streams that were encoded using any desired coding scheme. While the video decoder 20 includes its own address translation unit in this embodiment, other embodiments may include a video decoder 20 that uses the address translation unit 26. In such embodiments, the video decoder 20 may also be a latency sensitive request source, and may have a way or ways assigned to it in the latency sensitive partition of the TLB memory.

The mixer 16 may be configured to perform video mixing operations. The scaler 18 may be configured to perform video scaling operations. The shader 22 may be configured to perform pixel shading operations. Generally, the mixing, scaling, and shading may be part of generating a frame for display.

The high performance peripherals 30 may include various peripherals that are expected to generate significant bandwidth on the system interface unit 28, at least as compared to the other peripherals in the system 10. For example, in one embodiment, the high performance peripherals may include a networking media access controller (MAC) such as an Ethernet MAC, a wireless fidelity (WiFi) controller, and a universal serial bus (USB) controller. Other embodiments may include more or fewer peripherals, and may categorize and/or arrange the peripherals differently. For example, the MAC and USB controller may be medium performance peripherals the WiFi controller may be low performance peripherals. The other peripherals 34 may include various lower bandwidth peripherals such as an audio subsystem, flash memory interface, general purpose input/output (I/O), timers, an on-chip secrets memory, an encryption engine, etc., or any combination thereof. The DMA unit may be configured to perform transfers to and from the memory through the memory controller 42 on behalf of the peripherals 30 and 34.

The address translation unit 36 may be configured to translate addresses from the photo peripherals 38, which may include a camera interface, a joint photographic experts group (JPEG) coder/decoder (codec), and a video encoder, in one embodiment. Other embodiments may include other sets of photo peripherals 38. The address translation unit 36 may be similar to the address translation unit 26, or may include a non-partitioned TLB.

The processor 40 may implement any instruction set architecture, and may be configured to execute instructions in that instruction set architecture. The processor 40 may employ any microarchitecture, including scalar, superscalar, pipelined, superpipelined, out of order, in order, speculative, non-speculative, etc., or combinations thereof. The processor 40 may include circuitry, and optionally may implement microcoding techniques.

The memory controller 42 may be configured to receive memory requests from the system interface unit 28 (which may have received the requests from one or more other components as shown in FIG. 1). The memory controller 42 may access memory to complete the requests (writing received data to the memory for a write request, or providing data from the memory in response to a read request). The memory controller 42 may be configured to interface with any type of memory, such as dynamic random access memory (DRAM), synchronous DRAM (SDRAM), double data rate (DDR, DDR2, DDR3, etc.) SDRAM, RAMBUS DRAM (RDRAM), static RAM (SRAM), etc. The memory may be arranged as multiple banks of memory, such as dual inline memory modules (DIMM5), etc.

It is noted that, while the present embodiment assigns an equal number of ways to each latency sensitive request source (and thus an equal number of TLB locations), other embodiments need not assign an equal number of ways to each source. For example, if one request source is expected to have a larger working data set than others, it may be assigned more ways (to potentially store more translations) than other request sources expected to have smaller working data sets.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
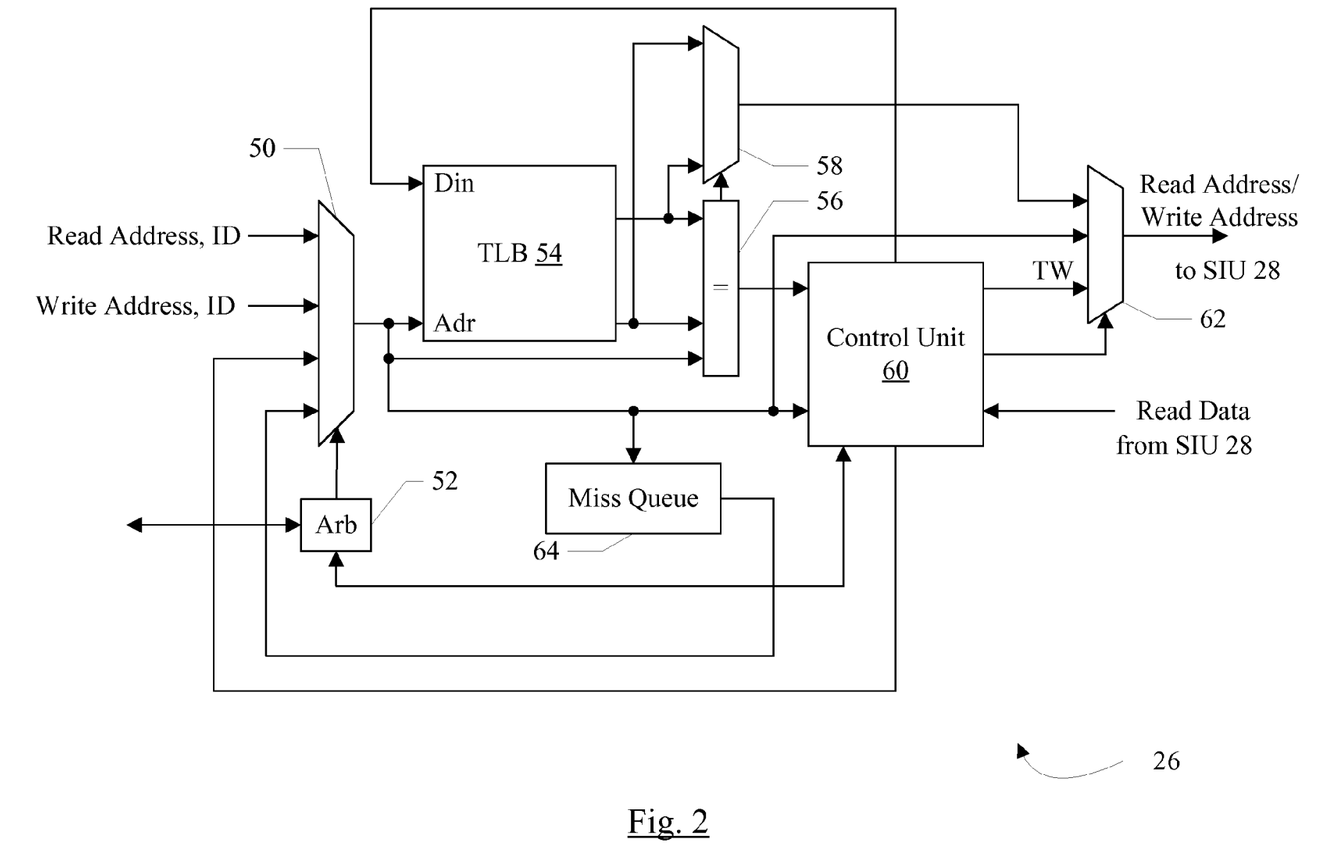
FIG. 2 is a block diagram of one embodiment of an address translation unit shown in FIG. 1.

Turning now to FIG. 2, a block diagram of one embodiment of the address translation unit 26 is shown. In the embodiment of FIG. 2, the address translation unit 26 includes an input multiplexor (mux) 50, an arbitration unit 52, a TLB 54, a comparator 56, a TLB output mux 58, a control unit 60, a translation unit output mux 62, and a miss queue 64. The input mux 50 is coupled to receive a read address and requestor identifier (ID), a write address and requestor ID, an input from the miss queue 64, and an input from the control unit 60. The output of the input mux 50 is coupled to an address input (Adr) of the TLB 54, the comparator 56, the control unit 60, the miss queue 64, and the output mux 62. The arbiter 52 is coupled to receive input from the interface unit 24 and from the control unit 60, and is configured to select one of the inputs through the input mux 50. The TLB 54 is configured to output translations from the ways of a selected entry in response to the input address, to both the TLB output mux 58 and the comparator 56. The comparator 56 is configured to control the output mux 58 and is coupled to provide a hit/miss signal to the control unit 60. The output of the mux 58 is coupled to the mux 62, and the control unit 60 provides an input to the mux 62. The control unit 60 is further coupled to provide a selection control to the control unit 60, and to receive read data from the system interface unit 28. The control unit 60 is further coupled to a data in input (Din) to the TLB 54.

In response to the input address and identifier, the TLB 54 may be configured to select the partition of the TLB memory and the set within the partition. The TLB 54 may be configured to output the translations from the set to the comparator 56 and the mux 58. Accordingly, in this embodiment, the TLB 54 is 2 way set associative. More particularly, the comparator 56 may receive the virtual page number tag from each entry and the mux 58 may receive the physical page number. The comparator 56 may be configured to compare the virtual page numbers to the virtual page number from the input address, and may be configured to select the hitting way (if any) through the mux 58 to the output mux 62. The comparator 56 may be configured to indicate hit, which may cause the control unit 60 to select the output of the mux 58 to transmit as the read address or write address to the system interface unit 28. The untranslated page offset bits may be passed through, or may be routed around the address generation unit 26. Similarly, the requestor ID may be routed around the address generation unit 26 or may be passed through. In an embodiment, untranslated page offset bits and requestor IDs may be passed through the address translation unit 26 (not routed around) because they may be stored in the address translation unit 26 (e.g. in the miss queue 64) in some cases.

If the address is a miss in the TLB 54, the comparator 56 may be configured to indicate miss to the control unit 60. The virtual address and other request information may be stored in the miss queue 64, and the control unit 60 may generate the physical address of a page table to be read for the translation. In one embodiment, the address translation mechanism may include using certain virtual address bits to select one of a set of segment registers in the control unit 60, where the segment registers each store a base address of a page table in memory. The virtual address may be used as an index to the page table, from which the translation may be read. Accordingly, a single page table read may be used in this embodiment. Other embodiments may make two or more page table reads to locate a desired translation.

Additionally, the control unit 60 may be configured to allocate a location to store the resulting translation. In the general access partition, the control unit 60 may be configured to allocate one of the set of entries that are indexed by the missing virtual address, using any replacement scheme (e.g. least recently used (LRU), pseudo-LRU, random, etc.). In the reserved partition, the control unit 60 may be configured to allocate the location in a way or ways assigned to the request source that transmitted the request (e.g. the video encoder 14 or the display controller 12, in this embodiment). If more than one way is assigned to a request source, a replacement scheme such as any of the replacement schemes described above may be used.

The control unit 60 may be configured to select the table walk address (TW) through the output mux 62 in response to a TLB miss. Subsequently, the read data may be returned for the table walk read to the control unit 60, which may be configured to form a TLB entry value to be written to the allocated entry. The control unit 60 may be configured to signal the arbiter 52 that a TLB update is ready, and to provide the update address as an input to the mux 50. When the arbiter grants the update, the control unit 60 may be configured to provide the update data to the data input (Din) of the TLB 54, which may be configured to write the translation to the entry identified by the update address. Subsequently, the original request may be replayed out of the miss queue to the mux 50, and the control unit 60 may be configured to inform the arbiter 52 that the replay is ready. The arbiter 52 may be configured to grant the replay, and the request may now hit in the TLB 54.

In some embodiments, the TLB 54 may support hit under miss processing for some requests. However, some requests may be required to be forwarded in the order received with respect to the request that experienced the TLB miss. For example, requests from the same requestor (i.e. having the same requestor ID) may be required to proceed in the order received. Such requests may be queued in the miss queue 64, independent of the hit/miss status of the request in the TLB 54, and may not be forwarded out of the address translation unit 26 until the TLB miss processing is complete and the miss can be serviced.

In one embodiment, the control unit 60 may also be configured to flush TLB entries in response to a flush or invalidate command. The control unit 60 may arbitrate for access and perform the flush/invalidation in a fashion similar to the above description for writing a new translation.

As mentioned above, some request sources may not have their addresses translated by the address translation unit 26. The virtual address connection to the output mux 62 may provide the bypass path for the case, and the control unit 60 may be configured to select the address through the mux 62 for the non-translated cases. Alternatively, the non-translated cases may use an independent path (not through the address translation unit 26) to the system interface unit 28. The virtual address bypass path may be controlled by a mode bit in such a case (e.g. enabling or disabling translation), whereby the virtual address is passed through unmodified when translation is disabled.

It is noted that a translation may not exist in the page tables for a given virtual address. In one embodiment, the lack of translation may be treated as an error. The error may be logged in a known location for software access, for example. Alternatively or in addition, the address translation unit 26 may signal an interrupt to the processor 40 to indicate the error. Other error processing may be performed as desired, in various embodiments.

Figure 3:
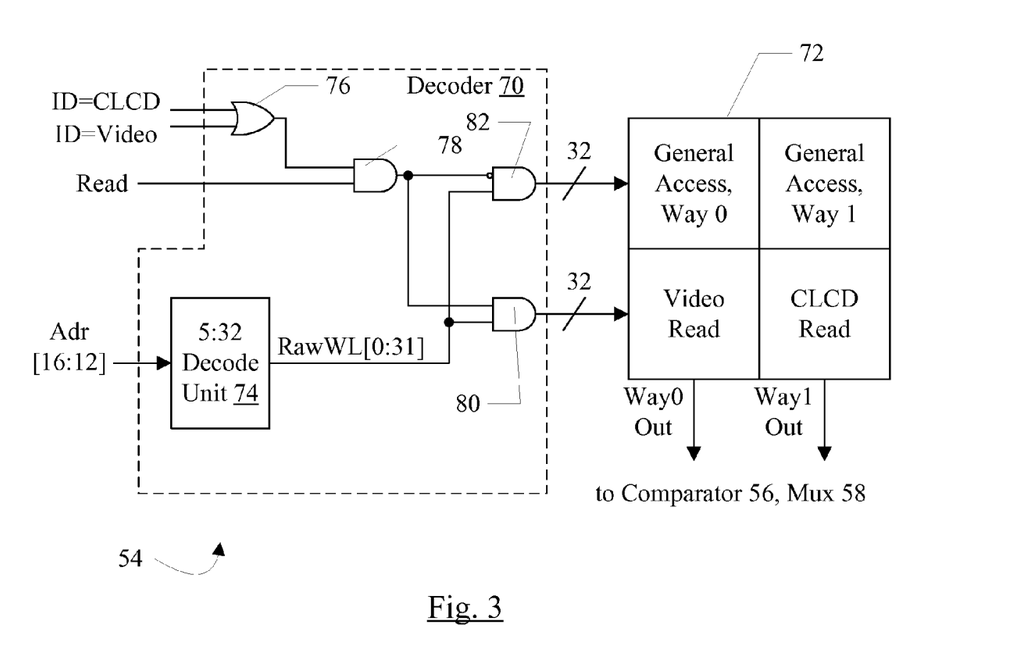
FIG. 3 is a block diagram of a translation lookaside buffer shown in FIG. 2.

FIG. 3 is a block diagram of one embodiment of the TLB 54 shown in FIG. 2. In the embodiment of FIG. 3, the TLB 54 includes a decoder 70 and a memory 72. The decoder 70 is coupled to the memory 72. More particularly, the decoder 70 is configured to generate word lines for each set in the memory 72. By modifying the decode based on the requestor ID and request type (read or write), the decoder 70 may be configured to statically partition the memory 72 into a two way set associative general access partition (the non-latency sensitive partition that is also used for write requests from latency sensitive requestors) and a reserved partition in which way 0 is assigned to video encoder read requests and way 1 is assigned to the CLCD display controller read request. The opposite way assignments may be used as well.

In this example, each partition includes 32 sets, and thus the memory 72 includes a total of 64 sets, one of which is selected for a given access. Other embodiments may include more or fewer sets per partition, as desired. The data in the way 0 and way 1 locations of the selected set are output by the memory 72 to the comparator 56 and the mux 58 in FIG. 2.

The decoder 70 is coupled to receive the index portion of the virtual address on the Adr input to the TLB 54 (VA[16:12] in this example) as well as the requestor ID and an indication of whether or not the request is a read. The index may be provided to a 5:32 decode unit 74, which be configured to output a 32 bit one hot vector of raw wordlines (RawWL[0:31] in FIG. 3) indicating the selected set within the selected partition. The raw wordlines may be qualified with the request information to select the partition. Specifically, the OR gate 76 and the AND gate 78 in FIG. 3 may represent identifying a read request (read signal asserted) that has a requestor ID assigned to either the display controller or the video encoder. If so, the reserved partition may be selected (output of the AND gate 78 asserted). If the request is a write (read signal deasserted), or the requestor ID identifies a request source other than the display controller or the video encoder, the general access partition may be selected (output of the AND gate 78 deasserted). The output of the AND gate 78 may be ANDed with each of the raw wordlines to provide the wordlines to the reserved partition, represented by the AND gate 80 in FIG. 3. The output of the AND gate 78 may be inverted and ANDed with each of the raw wordlines to provide the wordlines to the general access partition, represented by AND gate 82 in FIG. 3.

The details of the decoder 70 in FIG. 3 are presented to illustrate the static partitioning of the memory 72. The actual circuit implementation may vary, including any Boolean equivalents of the logic shown. For example, the AND gate 78 and the AND gates represented by the AND gates 82 and 80 may be collapsed into a single level of logic. Similarly, the logic may be integrated into the decode unit 74. For example, in one embodiment, the decode unit 74 and the memory 72 may be a standard macro memory cell that receives address bits and selects a set responsive to the address bits. For example, the decode unit 74 may be a 6:64 decode unit that receives 6 address bits and outputs 64 wordlines to the memory 72. The 6 address bits input to the decode unit 74 may include virtual address bits 16:12 and the output of AND gate 78. The output of the AND gate 78 may be treated as the most significant bit of the address input to the decode unit 74, for example, and the sets of the memory 72 would be physically distributed to the reserved section and general access section as shown in FIG. 3. Alternatively, the output of the AND gate 78 may be used as any other address bit input to the decode unit 74. If the output of the AND gate 78 is used as one of the middle bits of the 6 bits input to the decode unit 74, the reserved area and general access area may be physically interleaved in the memory 72, but the operation may be still be logically the same as that described above (the reserved area may only be accessed for reads from the CLCD or video sources, other operations may access the general access area).

Thus, in such embodiments, the overall decoder 70 may include a decode unit 74 that is integrated into the macro memory cell and logic to generate the "additional" address bit output from the AND gate 78.

Not shown in FIG. 3 is logic to override the decoder 70 in response to a TLB write generated by the control unit 60 in response to the translation data being returned from a table walk request and a valid translation being found for the TLB miss. The override may be integrated into the decoder 70 as well.

Figure 4:
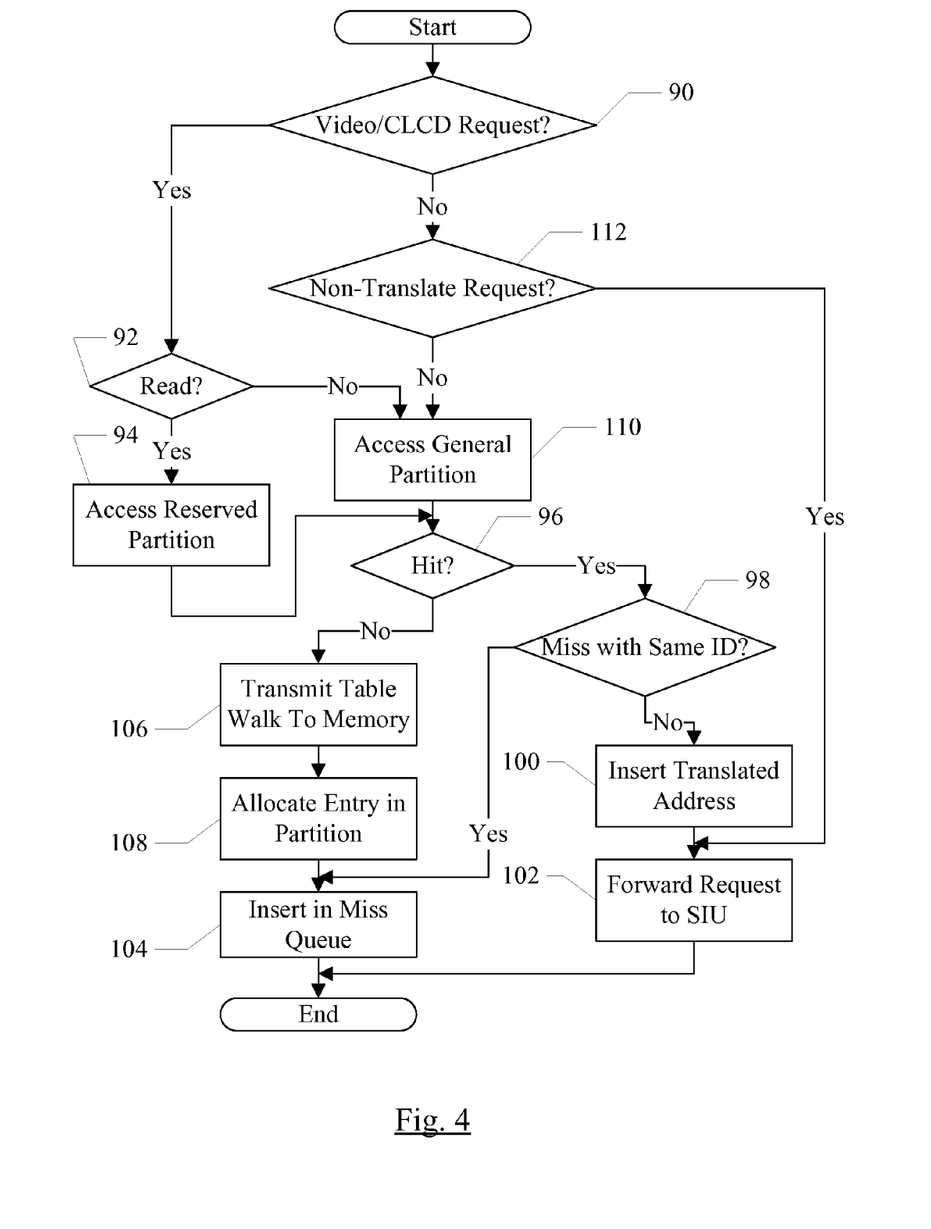
FIG. 4 is a flowchart illustrating operation of one embodiment of the translation lookaside buffer shown in FIG. 3 in response to a lookup.

Turning now to FIG. 4, a flowchart is shown illustrating operation of one embodiment of the address translation unit 26 in response to a memory request from the system interface 24 and sourced by one of the components 12, 14, 16, 18, 20, or 22. While the blocks are shown in a particular order for ease of understanding, other orders may be used. Blocks may be performed in parallel by combinatorial logic within the address translation unit 26. Blocks, combinations of blocks, and/or the flowchart as a whole may be pipelined over multiple clock cycles. Generally, the address translation unit 26 and/or the circuitry therein may be configured to implement the operation shown in FIG. 4.

If the request is from the video decoder 14 or display controller 12 (i.e. a latency sensitive source—decision block 90, "yes" leg), and the request is a read (decision block 92, "yes" leg), the TLB 54 may access the reserved partition (block 94). If the access is a hit (decision block 96, "yes" leg) and a miss with the same requester ID is not recorded in the miss queue 64 (decision block 98, "no" leg), the address translation unit 26 may insert the translated address into the request (e.g. selecting the output of the mux 58 through the mux 62, in the embodiment of FIG. 2—block 100). The request may be forwarded to the system interface unit 28 (block 102). If a miss with the same requestor ID is recorded in the miss queue (decision block 98, "yes" leg), the request may be queued in the miss queue 64 to await servicing the prior miss (block 104).

If the request is a miss in the TLB 54 (decision block 96, "no" leg), the address translation unit 26 may transmit a table walk request to memory to read the page table entry that may store the translation for the request (block 106). The address translation unit 26 may also allocate an entry in the partition (in this case, the reserved partition) to store the translation (block 108). Specifically in this embodiment, the address translation unit 26 may allocate the entry within the reserved partition from the set indexed by the virtual address of the request and in the way assigned to the particular requestor. The assigned entry, along with the other information defining the request, may be stored in the miss queue 64.

If the request is from the video encoder 14 or the display controller 12 (decision block 90, "yes" leg) but the request is a write request (decision block 92, "no" leg), the TLB 54 may access the general access partition (block 110). Similar miss/hit processing may be performed in response to the contents of the TLB 54 (blocks 96-108) as described above, except that allocating the entry for a miss may include selecting an entry from the general access partition. The way in the set of the general access partition indexed by the virtual address may be selected according to a replacement scheme implemented among the ways of the general access partition. Similarly, if the request is not from the video decoder 14 or the display controller 12 (decision block 90, "no" leg), but the request is to be translated (decision block 112, "no" leg), the TLB 54 may access the general access partition (block 110) and may handle the hit/miss processing as described above. If the request is not to be translated (decision block 112, "yes" leg), the address translation unit 26 may forward the request unmodified to the system interface unit 28 (block 102). For example, the virtual address bypass path through the mux 62 may be selected.

Figure 5:
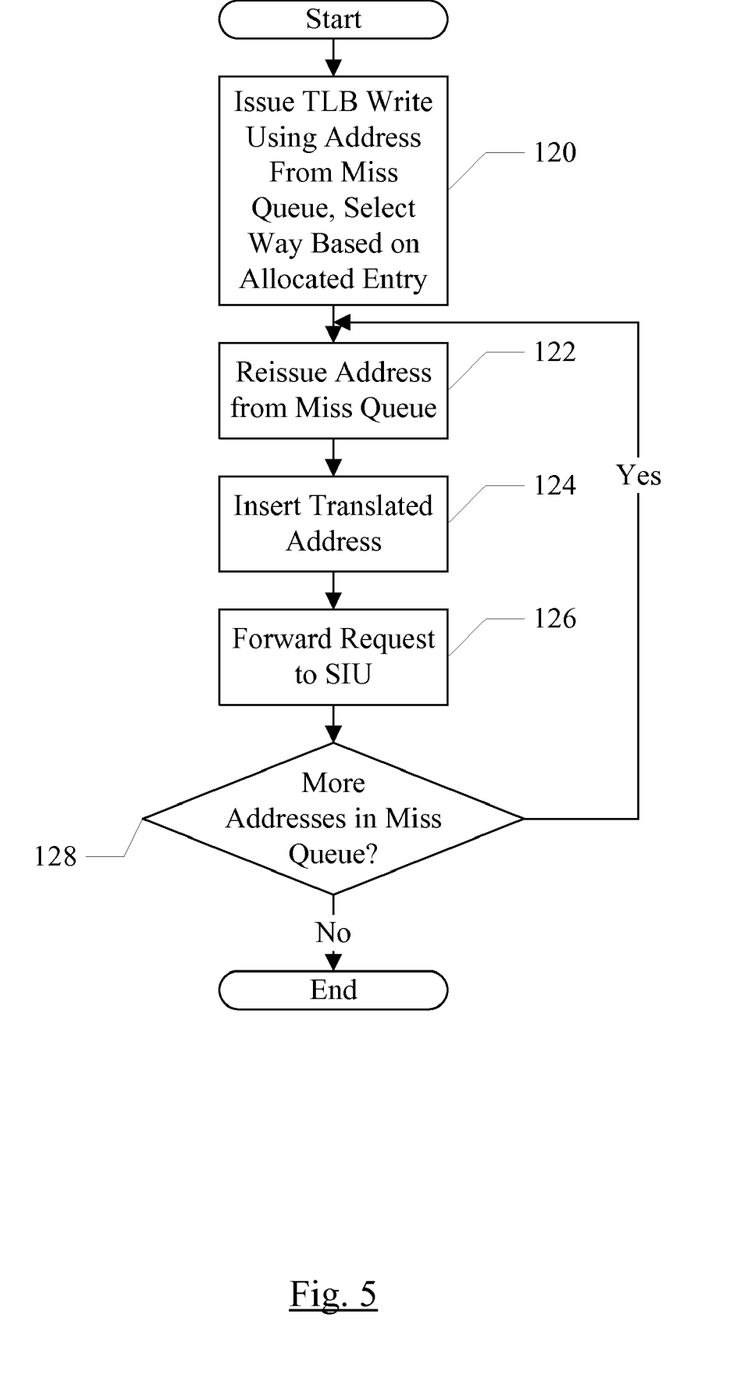
FIG. 5 is a flowchart illustrating operation of one embodiment of the translation lookaside buffer shown in FIG. 3 in response to data returning for a table walk read.

Turning now to FIG. 5, a flowchart is shown illustrating operation of one embodiment of the address translation unit 26 in response to read data being returned for a table walk read request issued from the address translation unit 26. While the blocks are shown in a particular order for ease of understanding, other orders may be used. Blocks may be performed in parallel by combinatorial logic within the address translation unit 26. Blocks, combinations of blocks, and/or the flowchart as a whole may be pipelined over multiple clock cycles. Generally, the address translation unit 26 and/or the circuitry therein may be configured to implement the operation shown in FIG. 5.

The address translation unit 26 may arbitrate for access to the TLB 54, and may issue a TLB write to the address from the head of the miss queue 64, and may select the way to be written based on the allocated entry indicated in the miss queue 64. The partition may be selected based on the requestor ID and the type of the original request (read or write), or the partition may also be indicated in the miss queue 64 (block 120).

After updating the TLB 54, the address translation unit 26 may arbitrate for access to the TLB 54 again, and may issue the address and request information from the miss queue 64 as a replayed request (block 122). The request may hit the newly written entry in the TLB 54, and the address translation unit 26 may insert the translated address into the request (block 124, similar to block 100 in FIG. 4) and forward the request to the system interface unit 28 (block 126, similar to block 102 in FIG. 4).

In this embodiment, the address translation unit 26 may support one outstanding page table read for a TLB miss. Accordingly, if there are more address in the miss queue 64 (decision block 128), the addresses behind the first entry in the miss queue 64 correspond to requests that were required to be ordered behind the request for which the TLB miss is detected, or correspond to other TLB misses. The addresses that are in the miss queue 53 for an ordering requirement may be replayed similar to the original miss (decision block 128, "yes" leg and blocks 122, 124, and 126), until the next miss is detected in the miss queue 64. Subsequently, a new page table read may be initiated for one of the other TLB misses in the miss queue 64.

Numerous variations and modifications will become apparent to those skilled in the art once the above disclosure is fully appreciated. It is intended that the following claims be interpreted to embrace all such variations and modifications.

What is claimed is:

1. An address translation unit comprising:

a memory configured to store a plurality of translations in a set associative configuration comprising at least a first way and a second way, wherein the memory is statically partitioned into a first portion and a second portion, wherein the first way in the first portion is dedicated to storing translations corresponding to a first video processing unit, and wherein the second way in the first portion is dedicated to storing translations corresponding to a second video processing unit, and wherein the second portion is used to store translations corresponding to other units that use the address translation unit; and a control unit coupled to the memory, wherein the control unit is configured to allocate a location in the memory store a translation in response to a miss in the memory for a first request, and wherein the control unit is configured to allocate the location responsive to a source of the first request, and wherein the control unit is configured to perform a table walk in a set of translation tables stored in memory to locate a translation for the first request, and wherein the control unit is configured to cause the memory to store the translation in the location allocated in response to the miss, and wherein the control unit is configured to supply a physical address from the location in response to a subsequent virtual address input to the memory that hits in the location, wherein the first way of the first portion is dedicated to read requests from the first video processing unit, wherein the control unit is configured to allocate the location in the first way of the first portion responsive to the first request being a read request from the first video processing unit.

2. The address translation unit as recited in claim 1 wherein the control unit is configured to allocate a second location in the second portion in response to a write request from the first video processing unit that misses in the memory.

3. The address translation unit as recited in claim 1 wherein the memory is configured to select one of the first portion or the second portion from which to read one or more translations in response to a second request for which the corresponding address is to be translated, the first portion or the second portion selected responsive to the source of the second request.

4. The address translation unit as recited in claim 3 wherein the first portion is dedicated to read requests generated by the first video processing unit and the second video processing unit, and wherein the memory is configured to select the first portion responsive to the second request being a read request.

5. An address translation unit comprising:
a memory coupled to receive at least a portion of a virtual address as an input, and wherein the memory is configured to store a plurality of translations in a set associative configuration comprising at least a first way and a second way, wherein the memory is partitioned into a first portion and a second portion, wherein the first way in the first portion is dedicated to storing translations corresponding to read requests from a first source, and wherein the second way in the first portion is dedicated to storing translations corresponding to read requests from a second source, and wherein the second portion is used to store translations corresponding to write requests from the first source and the second source, wherein a subset of memory entries in the memory are selected responsive to the portion of the virtual address; and
a control unit coupled to the memory, wherein the control unit is configured to allocate a location in the memory to store a translation in response to a miss in the memory for a first request, and wherein the control unit is configured to allocate the location responsive to a source of the first request and further responsive to whether or not the first request is a read request, and wherein the control unit is configured to translate the virtual address to a corresponding physical address in one of the subset of memory entries responsive to a hit one of the subset of memory entries.

6. The address translation unit as recited in claim 5 wherein the first source and the second source are video processing units.

7. The address translation unit as recited in claim 6 wherein the first source is a display controller.

8. The address translation unit as recited in claim 6 wherein the first source is a video encoder.

9. The address translation unit as recited in claim 6 wherein the first source is a video decoder.

10. A system comprising:
a plurality of request sources configured to generate memory requests;
an interface unit coupled to the plurality of request sources and configured to transmit the memory requests on an interconnect that includes an address interconnect and a data interconnect; and
an address translation unit coupled to the address interconnect, and wherein the address translation unit is configured to translate addresses in memory requests from at least some of the plurality of request sources, wherein the address translation unit comprises a translation lookaside buffer (TLB) that is partitioned into sections, wherein one or more of the sections is reserved for translations of read requests issued by one or more video processing units within the plurality of request sources, and wherein the address translation unit is configured to replace a virtual address in a first memory request with a physical address read from the TLB responsive to a hit in the TLB for the virtual address.

11. The system as recited in claim 10 wherein the plurality of request sources include at least one additional source for which the address translation unit is configured to use a non-reserved section of the TLB.

12. The system as recited in claim 11 wherein the TLB is configured to access the non-reserved section for write requests issued by the one or more video processing units.

13. A method comprising:
reserving one or more sections of a TLB to store translations loaded into the TLB in response to read requests issued by one or more video processing units that miss in the TLB;
accessing the TLB in response to a first read request from a first video processing unit of the one or more video processing units, wherein at least one of the reserved sections is accessed in response to the first read request;
accessing the TLB in response to a first write request from the first video processing unit, wherein at least one non-reserved section is accessed in response to the first write request;
in response to a hit in an accessed section for a given request, translating a virtual address in the given request to a physical address read from the TLB, wherein the given request accesses only one or more reserved sections or only one or more non-reserved sections.

14. The method as recited in claim 13 further comprising accessing the TLB in response to a second request from a different request source, wherein the at least one non-reserved section is accessed in response to the second request.

15. The method as recited in claim 13 wherein the TLB is set associative, and wherein the one or more reserved sections comprise a plurality of sets across the ways, and wherein the non-reserved section comprises a remaining plurality of sets across the ways, and wherein the method further comprises:
detecting a TLB miss for a second read request from the first video processing unit; and
allocating a location in one of the ways within one of the reserved sections to store a translation for the second read request, wherein the location is in a given one of the ways that is reserved for the first video processing unit, and wherein other ways in the reserved sections are reserved for other video processing units.

16. The method as recited in claim 15 further comprising:
performing a table walk in one or more translation tables to determine a translation corresponding to the second read request; and
writing the translation to the location in the reserved section.

17. A translation lookaside buffer (TLB) comprising:
a set associative memory that is partitioned into a first section and a second section; and
a decoder coupled to the memory and coupled to receive a portion of a virtual address to be translated, wherein the decoder is configured to decode the portion to identify a selected set, and wherein the decoder is further coupled to receive an identifier of a source of a request that includes the virtual address, and wherein the decoder is configured to select one of the first section and the second section responsive to the identifier, and wherein the memory is configured to output a contents of each way in the selected set in the selected section, wherein the decoder is further coupled to receive an indication of whether or not the request is a read, and wherein the decoder is configured to select the one of the first section or the second section further responsive to whether or not the request is a read; and
control circuitry configured to detect a hit for the virtual address in one of the ways of the selected set, wherein the control circuitry is configured to replace the virtual address with a physical address read from the one of the ways in the selected set.

18. The TLB as recited in claim 17 wherein the decoder is configured to select the first section if the request is a read and the source is a video processing unit, and wherein the decoder is configured to select the second section otherwise.

19. The TLB as recited in claim 18 wherein the decoder configured to select one of the ways in the first portion in response to a TLB miss by a read request from the video processing unit, wherein the one of the ways is statically assigned to the video processing unit.

* * * * *